US008794371B2

(12) United States Patent
Strueh

(10) Patent No.: US 8,794,371 B2
(45) Date of Patent: Aug. 5, 2014

(54) POWER STEERING APPARATUS

(75) Inventor: Timothy C. Strueh, Linden, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 115 days.

(21) Appl. No.: 13/527,965

(22) Filed: Jun. 20, 2012

(65) Prior Publication Data

US 2013/0341116 A1 Dec. 26, 2013

(51) Int. Cl.
B62D 5/065 (2006.01)
B62D 5/06 (2006.01)

(52) U.S. Cl.
CPC ............... B62D 5/065 (2013.01); B62D 5/063 (2013.01)
USPC .......................................................... 180/442

(58) Field of Classification Search
CPC ................................ B62D 5/065; B62D 5/063
USPC ............................... 180/421, 422, 442
See application file for complete search history.

(56) References Cited

U.S. PATENT DOCUMENTS

| 2,411,606 | A | | 11/1946 | Ohe et al. | |
| 4,412,789 | A | | 11/1983 | Ohe et al. | |
| 4,798,256 | A | * | 1/1989 | Fassbender | 180/406 |
| 5,842,837 | A | * | 12/1998 | Nakayoshi et al. | 417/286 |
| 6,173,728 | B1 | * | 1/2001 | Venable et al. | 137/112 |
| 6,354,393 | B1 | * | 3/2002 | Ahlert et al. | 180/403 |
| 7,510,044 | B2 | | 3/2009 | Williams | |
| 8,348,635 | B2 | * | 1/2013 | Yamashita et al. | 417/307 |
| 2013/0186704 | A1 | * | 7/2013 | Noah | 180/441 |

* cited by examiner

Primary Examiner — Kevin Hurley
(74) Attorney, Agent, or Firm — Tarolli, Sundheim, Covell & Tummino LLP

(57) ABSTRACT

An apparatus (10) for use in turning steerable vehicle wheels (14, 16) includes a first pump (30) driven by an engine (42) of the vehicle to supply fluid to the fluid inlet (38) of a power steering motor assembly (12). A second pump (46) is driven by the engine (42) to supply fluid under pressure to the power steering motor assembly (12). The second pump (46) has an input (48) connected in fluid communication with an output (36) of the first pump (30) when a pressure at the fluid inlet (38) is below a predetermined value.

15 Claims, 1 Drawing Sheet

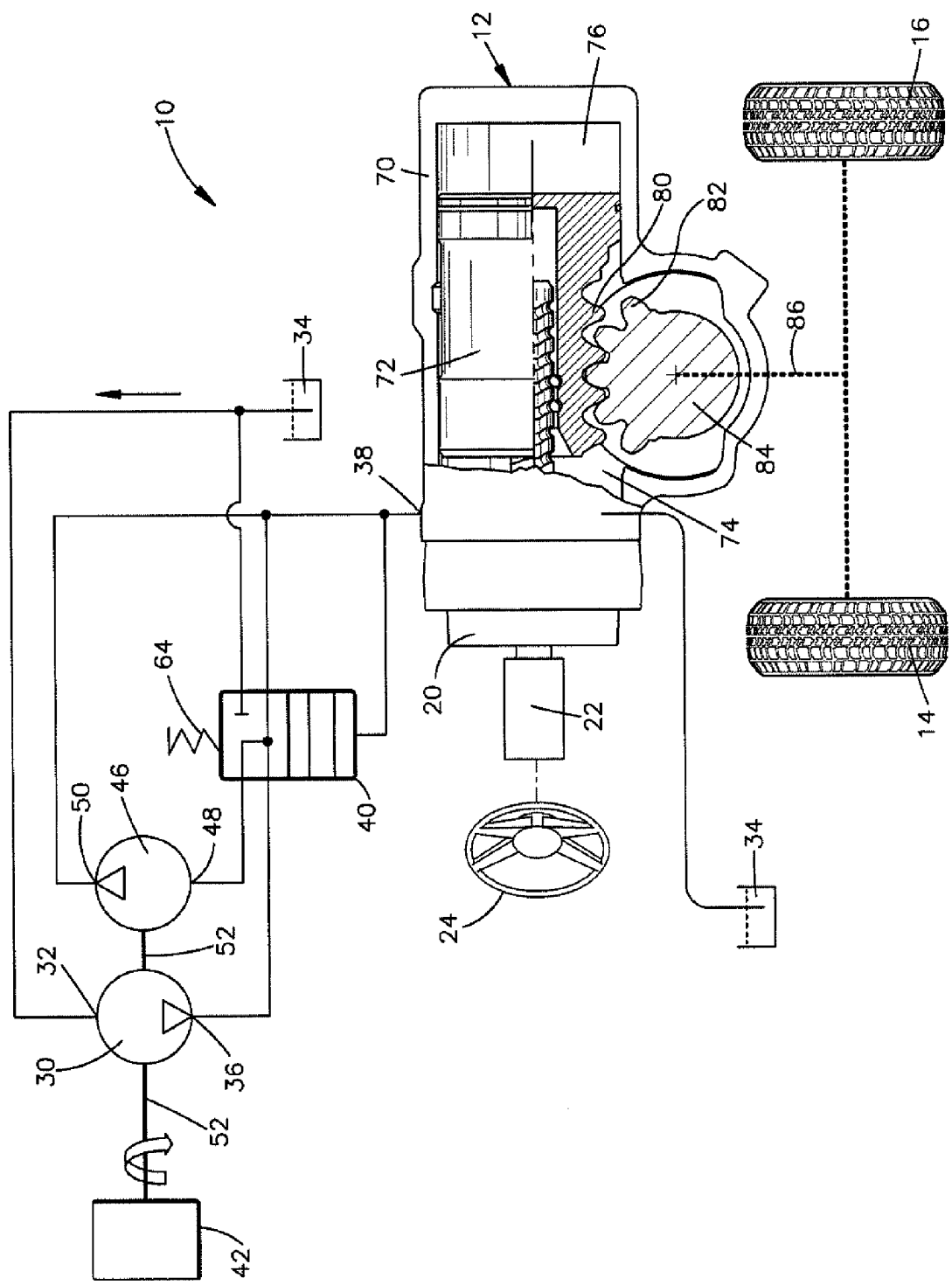

POWER STEERING APPARATUS

BACKGROUND OF THE INVENTION

The present invention is directed to an apparatus for use in turning steerable vehicle wheels.

A known apparatus for use in turning steerable vehicle wheels includes a power steering pump. The power steering pump is typically sized to provide maximum rated flow required to dry park a vehicle at engine idle. At highway speeds the engine can operate at two or three times its idle speed. Therefore, the fixed displacement power steering pump may provide excess flow and excess pressure at highway speeds. Excess flow from the power steering pump is diverted away from a hydraulic steering gear by a flow control valve. Therefore, only the rated flow is received by the hydraulic steering gear. Power consumed by this known system is determined by total flow delivered by the pump as a function of engine speed and the pressure drop of the steering system. One known power steering system having this general construction is disclosed in U.S. Pat. No. 5,184,693.

SUMMARY OF THE INVENTION

The present invention is directed to an apparatus for use in turning steerable vehicle wheels includes a power steering motor assembly connected with the steerable vehicle wheels. The power steering motor assembly has a fluid inlet. A first pump driven by an engine of the vehicle supplies fluid under pressure to the fluid inlet of the power steering motor assembly. The first pump has an input connected in fluid communication with a reservoir and an output. A second pump connected with the power steering motor assembly is driven by the engine of the vehicle to supply fluid under pressure to the power steering motor assembly. The second pump has an input connected in fluid communication with the output of the first pump when a pressure at the fluid inlet of the power steering motor assembly is below a predetermined value.

In another aspect of the present invention an apparatus for use in turning steerable vehicle wheels includes a power steering motor assembly connected with the steerable vehicle wheels. A first pump in fluid communication with the power steering motor assembly is continuously driven by an engine of the vehicle, during operation of the engine, to supply fluid under pressure to said power steering motor assembly. A second pump in fluid communication with the power steering motor assembly is continuously driven by the engine of the vehicle, during operation of the engine, to supply fluid under pressure to the power steering motor assembly. A valve in fluid communication with the power steering motor assembly and the first and second pumps directs fluid flow from an output of the first pump to an input of the second pump in response to a predetermined vehicle operating condition.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic illustration of a power steering apparatus constructed and operated in accordance with the present invention.

DESCRIPTION OF SPECIFIC PREFERRED EMBODIMENTS OF THE INVENTION

A vehicle steering apparatus 10 constructed in accordance with the present invention is illustrated in FIG. 1. The vehicle steering apparatus 10 includes a hydraulic power steering motor assembly 12 which is connected with steerable vehicle wheels 14 and 16. A steering control valve 20 is connected with the power steering motor assembly 12. The steering control valve 20 has an input shaft 22 which is connected with a manually rotatable vehicle steering wheel 24. The steering control valve 20 may be an open center control valve.

A first pump 30 has a fluid input 32 connected in fluid communication with a fluid reservoir 34. A fluid output 36 of the first pump 30 is connected in fluid communication with a fluid inlet 38 of the steering control valve 20 by a valve 40. The first pump 30 is continuously driven by an engine 42 of the vehicle, during operation of the engine. Therefore, during operation of the engine 42, the pump 30 continuously supplies fluid under pressure to the power steering motor assembly 12.

A second pump 46 has a fluid input 48 connected in fluid communication with the valve 40. A fluid output 50 of the second pump 46 is connected in fluid communication with the inlet 38 of the steering control valve 20. The second pump 46 is continuously driven by the engine 42 of the vehicle, during operation of the engine. Therefore, during operation of the engine 42, the second pump 46 continuously supplies fluid under pressure to the power steering motor assembly 12. It is contemplated that the first and second pumps 30 and 46 may be mounted on the same output shaft 52 of the engine 42. It is also contemplated that the first and second pumps 30 and 46 may be located in the same housing.

The valve 40 operates to place the input 48 of the second pump 46 in fluid communication with either the reservoir 34 or the output 36 of the first pump 30. The valve 40 maintains the output 36 of the first pump 30 in fluid communication with the steering control valve 20. When the valve 40 is in a first condition, shown in FIG. 1, the input 48 of the second pump 46 is in fluid communication with the output 36 of the first pump 30 and is not in direct fluid communication with the reservoir 34.

When the valve 40 is in a second condition, the inlet 38 of the second pump 46 is in direct fluid communication with the reservoir 34. When the valve 40 is in the second condition, both the first and second pumps 30 and 46 supply fluid from the reservoir 34 to the steering control valve 20. When the valve 40 is in the second condition both the first pump 30 and the second pump 34 are being driven by the engine 42 and are in fluid communication with the reservoir 34. Therefore, the fluid flow from the second pump 46 joins the fluid flow from the first pump 30. The combined fluid flow is conducted to the power steering motor assembly 12.

The valve 40 moves from the first condition to the second condition upon the occurrence of a predetermined vehicle operating condition. In the illustrated embodiment of the invention, the predetermined operating condition occurs when the pressure at the inlet 38 of the steering control valve 20 is above a predetermined value indicating that the demand of the power steering assembly 12 is relatively high. This may occur when the vehicle is idling and the steering wheel 24 is rotated.

The valve 40 includes a spring 64 at a first end urging the valve toward the first condition. The second opposite end of the valve 40 is in fluid communication with the inlet 38 of the steering control valve 20. Accordingly, the valve 40 moves from the first condition to the second condition under the influence of fluid pressure conducted from the inlet 38 of the steering control valve 20. The pressure at the inlet 38 of the steering control valve 20 urges the valve 40 toward the second condition. Accordingly, when the steering demand from the steering control valve 20 is relatively high, the pressure at the inlet 38 is high and the valve 40 moves from the first condition to the second condition. It is contemplated that the valve 40 moves from the first condition to the second condition when the engine speed is below a predetermined level and the steering wheel 24 is rotated. Although the valve 40 is shown as including an end in fluid communication with the inlet 38 of the steering control valve 20, it is contemplated that the valve 40 may include a solenoid that moves the valve from the first condition to the second condition when a sensor senses that the pressure at the inlet of the steering control valve is above a predetermined value.

The power steering motor assembly 12 may be of the well known integral type and includes a housing 70 which encloses a piston 72. The piston 72 cooperates with the housing 70 to define a head end chamber 74 and a rod end chamber 76. The steering control valve 20 controls fluid flow to and from the head and rod end chambers 74 and 76 in a known manner in response to rotation of the steering wheel 24. Fluid discharged from the power steering motor assembly 12 is conducted to the reservoir 34.

The piston 72 has a linear array 80 of rack teeth which are disposed in meshing engagement with an arcuate array of pinion teeth 82. The pinion teeth 82 are disposed on a sector gear 84 which is connected with a steering linkage 86. The power steering motor assembly 12 has a known construction which is generally similar to the construction of the power steering motor assembly disclosed in U.S. Pat. No. 6,546,322. Of course, the power steering motor assembly may have a different type of construction if desired.

When a vehicle in which the engine 42 is disposed is being driven along a highway at normal cruising speeds and the steering wheel 24 is rotated, the demand for fluid from the steering control valve 20 is relatively low and the pressure at the inlet 38 of the steering control valve is below the predetermined value. Therefore, the valve 40 is in the first condition shown in FIG. 1. The input 48 of the second pump 46 is in fluid communication with the output 36 of the first pump. Accordingly, the second pump 46 merely conducts fluid from the output 36 of the first pump 30 to the power steering motor assembly 12.

When a vehicle in which the engine 42 is disposed slows and is performing maneuvers similar to parking maneuvers, the speed of operation of the engine 42 will decrease. When this occurs, the demand for fluid from the steering control valve 20 is relatively high and the pressure at the inlet 38 of the steering control valve increases above the predetermined value. This causes the valve 40 to move from the first condition to the second condition. The inputs 32 and 48 of the first and second pumps 30 and 46 are in direct fluid communication with the reservoir 34 and the outputs 36 and 50 are in direct fluid communication with the steering control valve 20. The fluid outputs from the first and second pumps 30 and 46 are combined to move the piston 72 relative to the housing 70 and steer the steerable vehicle wheels 14, 16. This provides a flow of fluid which can satisfy the demands of the power steering motor assembly 12.

From the above description of the invention, those skilled in the art will perceive applications, improvements, changes and modifications to the present invention. Such applications, improvements, changes and modifications within the skill of the art are intended to be covered by the appended claims.

Having described the invention, the following is claimed:

1. An apparatus for use in turning steerable vehicle wheels, said apparatus comprising:
   a power steering motor assembly connected with the steerable vehicle wheels, said power steering motor assembly having a fluid inlet;
   a first pump driven by an engine of the vehicle to supply fluid under pressure to said fluid inlet of said power steering motor assembly, said first pump having an input connected in fluid communication with a reservoir and an output; and
   a second pump which is connected with said power steering motor assembly and is driven by the engine of the vehicle to supply fluid under pressure to said power steering motor assembly, said second pump having an input connected in fluid communication with said output of said first pump only when a pressure at said fluid inlet of said power steering motor assembly is below a predetermined value.

2. An apparatus as set forth in claim 1 wherein said input of said second pump is connected in fluid communication with said reservoir when the pressure at said fluid inlet of said power steering assembly is above the predetermined value.

3. An apparatus as set forth in claim 1 wherein said first and second pumps are continuously driven by the engine of the vehicle during operation of the engine.

4. An apparatus as set forth in claim 1 wherein said first and second pumps are mounted on the same shaft.

5. An apparatus as set forth in claim 1 wherein a valve is connected in fluid communication with said power steering motor assembly and said first and second pumps, said valve directing fluid flow from the output of said first pump to the input of said second pump when the pressure at said fluid inlet of said power steering motor assembly is below the predetermined value.

6. An apparatus as set forth in claim 5 wherein said valve directs all fluid flow from said first pump to said power steering motor assembly when the pressure at said fluid inlet of said power steering assembly is above the predetermined value.

7. An apparatus as set forth in claim 5 wherein said valve is operated from a first condition to a second condition under the influence of fluid pressure at said fluid inlet of said power steering motor assembly, said valve being effective to direct fluid flow from the output of the first pump to the input of the second pump when said valve is in the first condition, said valve being effective to direct fluid flow from the output of said first pump to said power steering motor assembly and from the reservoir to said second pump when said valve is in the second condition.

8. An apparatus as set forth in claim 7 wherein a spring urges said valve toward the first condition.

9. An apparatus for use in turning steerable vehicle wheels, said apparatus comprising:
   a power steering motor assembly connected with the steerable vehicle wheels;
   a first pump which is in fluid communication with said power steering motor assembly and is continuously driven by an engine of the vehicle, during operation of the engine, to supply fluid under pressure to said power steering motor assembly;
   a second pump which is in fluid communication with said power steering motor assembly and is continuously driven by the engine of the vehicle, during operation of the engine, to continuously supply fluid under pressure to said power steering motor assembly;
   a valve which is in fluid communication with said power steering motor assembly and said first and second pumps, said valve directing fluid flow from an output of said first pump to an input of said second pump in response to a predetermined vehicle operating condition.

10. An apparatus as set forth in claim 9 wherein said valve directs fluid flow from said output of said first pump to said input of said second pump when a fluid demand of said power steering motor assembly is low.

11. An apparatus as set forth in claim 9 wherein said input of said second pump is connected in fluid communication with said reservoir when the fluid demand of said power steering motor assembly is relatively high.

12. An apparatus as set forth in claim 9 wherein said first and second pumps are mounted on the same shaft.

13. An apparatus as set forth in claim 9 wherein said valve is operated from a first condition to a second condition in response the predetermined operating condition, said valve being effective to direct fluid flow from the output of the first pump to the input of the second pump when said valve is in the first condition, said valve being effective to direct fluid from the output of said first pump to said power steering motor assembly and from the reservoir to said second pump when said valve is in the second condition.

14. An apparatus as set forth in claim 12 wherein a spring urges said valve toward the first condition.

15. An apparatus as set forth in claim 13 wherein the pressure at said fluid inlet of said power steering motor assembly urges said valve toward the second condition.

* * * * *